United States Patent
Mawby (10) Patent No.: US 10,352,828 B2
(45) Date of Patent: Jul. 16, 2019

(54) TIRE UNIFORMITY IMPROVEMENT THROUGH IDENTIFICATION OF A COMPOSITE UNIFORMITY PARAMETER USING MULTIVARIATE NORMAL DISTRIBUTIONS

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH); William David Mawby, Greenville, SC (US)

(72) Inventor: William David Mawby, Greenville, SC (US)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 74 days.

(21) Appl. No.: 15/500,154

(22) PCT Filed: Jul. 31, 2014

(86) PCT No.: PCT/US2014/049165
§ 371 (c)(1),
(2) Date: Jan. 30, 2017

(87) PCT Pub. No.: WO2016/018370
PCT Pub. Date: Feb. 4, 2016

(65) Prior Publication Data
US 2017/0241866 A1    Aug. 24, 2017

(51) Int. Cl.
*G01M 17/02* (2006.01)
*B29D 30/00* (2006.01)
*G01M 1/16* (2006.01)

(52) U.S. Cl.
CPC ......... *G01M 17/02* (2013.01); *B29D 30/0061* (2013.01); *G01M 1/16* (2013.01); *B29D 2030/0066* (2013.01)

(58) Field of Classification Search
CPC .... G01M 17/02; G01M 1/16; B29D 30/0061; B29D 30/0066; B29D 30/0633
See application file for complete search history.

(56) References Cited

U.S. PATENT DOCUMENTS

| 4,458,451 A | 7/1984 | Rogers |
| 4,889,425 A | 12/1989 | Edwards et al. |

(Continued)

FOREIGN PATENT DOCUMENTS

| EP | 1134573 | 9/2001 |
| EP | 2626684 | 8/2013 |

(Continued)

OTHER PUBLICATIONS

Friendly et al., "Elliptical Insights: Understanding Statistical Methods through Elliptical Geometry," Statistical Science, vol. 28, No. 1, Feb. 2013, pp. 1-40.*

(Continued)

*Primary Examiner* — Manuel L Barbee
(74) *Attorney, Agent, or Firm* — Dority & Manning, P.A.

(57) ABSTRACT

Methods and systems for improving the uniformity of a tire are provided. More specifically, one or more characteristics of a composite uniformity parameter can be determined from uniformity summary data (e.g. uniformity vectors) associated with a plurality of harmonics of the composite uniformity parameter. For instance, a peak to peak range of a composite uniformity parameter and/or a distribution of amplitudes of a composite uniformity parameter for a set of tires can be determined from uniformity vectors associated with selected harmonics of the composite uniformity parameter. According to example aspects of the present disclosure, the one or more characteristics of the composite uniformity parameter can be determined using multivariate normal distributions (e.g. bivariate normal distributions) of the uniformity summary data. Once identified, the one or more characteristics can be used to modify tire manufacture to improve tire uniformity.

15 Claims, 5 Drawing Sheets

(56) References Cited

U.S. PATENT DOCUMENTS

| | | |
|---|---|---|
| 6,290,388 B1 | 9/2001 | Saul et al. |
| 6,405,146 B1 | 6/2002 | Engel |
| 6,496,834 B1* | 12/2002 | Cereghini ......... G06F 17/30598 707/737 |
| 2003/0112234 A1 | 6/2003 | Brown et al. |
| 2005/0081614 A1 | 4/2005 | Zhu |
| 2005/0228650 A1 | 10/2005 | Huang |
| 2006/0031024 A1 | 2/2006 | Mountassir |
| 2009/0063095 A1 | 3/2009 | Bagwell |
| 2011/0185458 A1 | 7/2011 | Kysar et al. |
| 2012/0031179 A1* | 2/2012 | Mawby .............. B29D 30/0061 73/146 |
| 2012/0035757 A1* | 2/2012 | Mawby .............. B29D 30/0633 700/104 |
| 2012/0095587 A1 | 4/2012 | Hair, Jr. et al. |
| 2013/0090879 A1 | 4/2013 | Estor et al. |
| 2013/0098148 A1 | 4/2013 | Mawby et al. |
| 2013/0253686 A1 | 9/2013 | Flament et al. |
| 2014/0350879 A1 | 11/2014 | Takigushi et al. |
| 2015/0039630 A1 | 2/2015 | Thomee |
| 2015/0300921 A1* | 10/2015 | Nicholson ............ G01M 17/02 73/146 |

FOREIGN PATENT DOCUMENTS

| | | |
|---|---|---|
| EP | 2745224 | 6/2014 |
| JP | H10/281913 | 10/1998 |
| JP | 2000/234980 | 8/2000 |
| JP | 2005/186790 | 7/2005 |
| JP | 2006/105775 | 4/2006 |
| JP | 2013/210355 | 10/2013 |
| WO | WO 02/099377 | 12/2002 |
| WO | WO 2013/099984 | 4/2013 |
| WO | WO 2014/092722 | 6/2014 |

OTHER PUBLICATIONS

Nolan, "Multivariate Elliptically Contoured Stable Distributions: Theory and Estimation," American University, Oct. 31, 2006.*
PCT International Search Report for corresponding PCT Application No. PCT/US2014/049151, dated Dec. 5, 2014—2 pages.
PCT International Search Report for corresponding PCT Application No. PCT/US2014/049165, dated Nov. 19, 2014—2 pages.
PCT International Search Report for corresponding PCT Application No. PCT/US2014/049170, dated Dec. 5, 2014—2 pages.
PCT International Search Report for corresponding PCT Application No. PCT/US2014/049174, dated Dec. 5, 2014—2 pages.
Nolan, "Multivariate elliptically contoured stable distributions: theory and estimation," American University, Oct. 31, 2006—17 pages.
Sibley, "Weibull Analysis as a Tool for Yield Analysis and Control Charting," M.A. Sibley Consulting, Feb. 24, 2013—38 pages.
Tentzerakis et al., "Evaluation of Wind Farm Harmonic Current Emissions," European Wind Energy Conference & Exhibition Conference, May 7-10, 2007, Milan, Italy—9 pages.
Boudt et al., "Robust and Explicit Estimators for Weibull Parameters," *Metrika*, vol. 73, Issue. 2, Mar. 2011—27 pages.

* cited by examiner

TIRE UNIFORMITY IMPROVEMENT THROUGH IDENTIFICATION OF A COMPOSITE UNIFORMITY PARAMETER USING MULTIVARIATE NORMAL DISTRIBUTIONS

FIELD

The present disclosure relates to tire uniformity and more particularly to improving tire uniformity by identification of characteristics of a composite uniformity parameter from uniformity summary data using multivariate normal distributions.

BACKGROUND

Tire non-uniformity relates to the symmetry (or lack of symmetry) relative to the tire's axis of revolution in certain quantifiable characteristics of a tire. Conventional tire building methods unfortunately have many opportunities for producing non-uniformities in tires. During revolution of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity parameters, or attributes, are generally categorized as dimensional or geometric variations (radial run out and lateral run out), mass variance, and rolling force variations (radial force variation, lateral force variation and tangential force variation, sometimes also called longitudinal or fore and aft force variation). Uniformity measurement machines often calculate the above and other uniformity characteristics by measuring force at a number of points around a tire as the tire is rotated about its axis to generate a uniformity waveform.

A tire uniformity waveform can be composed of a large number of harmonics, such as a first harmonic, second harmonic, third harmonic, etc. The individual harmonics can be obtained using Fourier decomposition of the uniformity waveform. The individual harmonics of a uniformity waveform are often expressed as uniformity vectors having a magnitude and phase angle. The magnitude can represent the maximum value of the harmonic. The phase angle can represent the location of the maximum value of the harmonic about the azimuth of the tire. Uniformity vectors can also be decomposed and expressed as rectangular x and y components.

SUMMARY

Aspects and advantages of embodiments of the present disclosure will be set forth in part in the following description, or may be learned from the description, or may be learned through practice of the embodiments.

One example aspect of the present disclosure is directed to a method for improving the uniformity of a tire. The method includes obtaining, by one or more computing devices, uniformity data associated with a set of a plurality of tires. The uniformity data includes a first set of uniformity vectors associated with a first selected harmonic of a uniformity parameter measured for the set of tires and a second set of uniformity vectors associated with a second selected harmonic of the uniformity parameter. The method further includes determining, by the one or more computing devices, a first set of parameters for a first multivariate normal distribution associated with the first set of uniformity vectors and determining, by the one or more computing devices, a second set of parameters for a second multivariate normal distribution associated with the second set of uniformity vectors. The method further includes determining, by the one or more computing devices, a composite set of parameters associated with a composite multivariate normal distribution for the set of tires based at least in part on the first set of parameters and the second set of parameters. The method further includes identifying, by the one or more computing devices, one or more characteristics of a composite uniformity parameter for the set of tires based at least in part on the composite set of parameters and modifying tire manufacture based at least in part on the one or more characteristics of the composite uniformity parameter.

Another example aspect of the present disclosure is directed to a system for improving the uniformity of a tire. The system includes one or more processors and one or more memory devices. The one or more memory devices can store computer-readable instructions that when executed cause the one or more processors to perform operations. The operations can include one or more aspects of any of the methods disclosed herein.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Example aspects of the present disclosure are directed to methods and systems for improving the uniformity of a tire. More specifically, one or more characteristics of a composite uniformity parameter can be determined from uniformity summary data (e.g. uniformity vectors) associated with a plurality of harmonics of the composite uniformity parameter. For instance, a peak to peak range of a composite uniformity parameter and/or a distribution of amplitudes of a composite uniformity parameter for a set of tires can be determined from uniformity vectors associated with selected harmonics of the composite uniformity parameter. According to example aspects of the present disclosure, the one or more characteristics of the composite uniformity parameter can be determined using multivariate normal distributions (e.g. bivariate normal distributions) of the uniformity summary data. Once identified, the one or more characteristics can be used to modify tire manufacture to improve tire uniformity.

Uniformity data can be collected for one or more tires by performing a plurality of uniformity measurements of a composite uniformity parameter at discrete data points for one or more revolutions of each tire. The uniformity data can be analyzed and used to sort or grade tires during tire manufacture. Tires that do not satisfy certain uniformity criteria can be subjected to a uniformity correction process to improve the uniformity of a tire.

Figure 1:
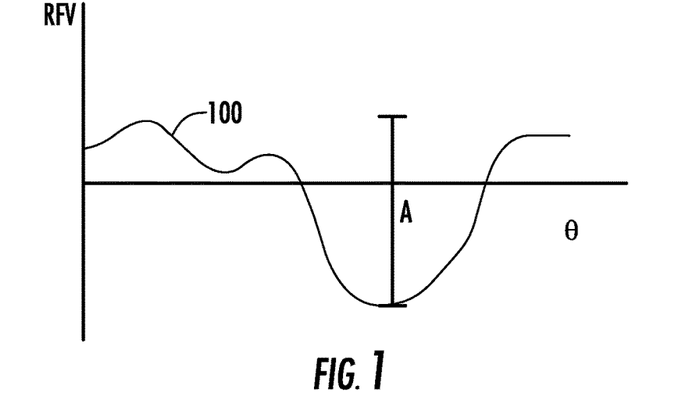
FIG. 1 depicts an example composite uniformity waveform.

Examples of composite uniformity parameters can include but are not limited to one or more of the following: radial run out, lateral run out, mass variance, balance, radial force variation, lateral force variation, and tangential force variation. The plurality of uniformity measurements performed at the discrete data points can be collectively represented as a composite uniformity waveform. FIG. 1 depicts an example composite uniformity waveform 100 of radial force variation for an example tire. FIG. 1 plots tire azimuth along the abscissa and the magnitude of the uniformity measurement along the ordinate.

Figure 2:
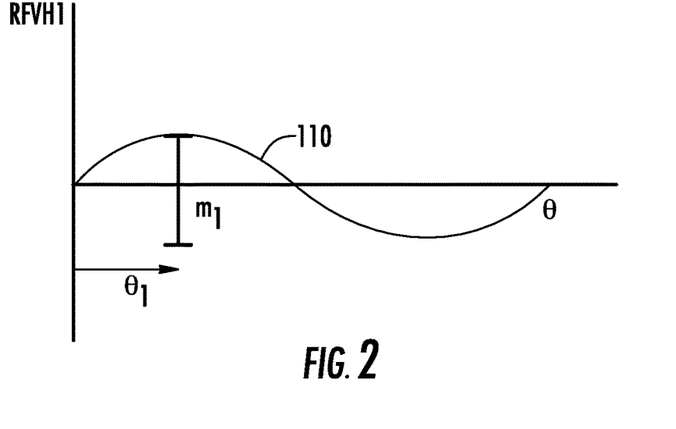
FIG. 2 depicts an example first harmonic of the composite uniformity waveform.
Figure 3:
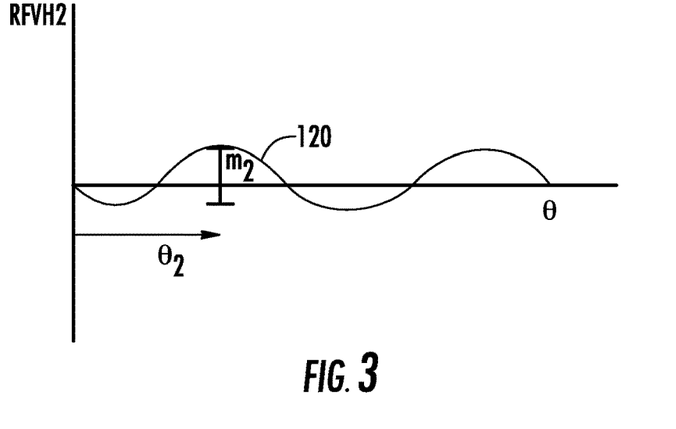
FIG. 3 depicts an example second harmonic of the composite uniformity waveform.

Composite uniformity data (e.g. a composite uniformity waveform) measured for a tire can comprise a large number of combined harmonics. The individual harmonics may be obtained by applying Fourier decomposition to the composite data. For instance, the composite radial force variation waveform 100 for a tire can be broken down into a first harmonic, second harmonic, third harmonic, fourth harmonic, etc., using Fourier decomposition. FIG. 2 depicts an example first harmonic 110 of the radial force variation waveform 100 of FIG. 1. FIG. 2 plots tire azimuth along the abscissa and magnitude of the first harmonic of radial force variation along the ordinate. FIG. 3 depicts an example second harmonic 120 of the radial force variation waveform 100 of FIG. 1. FIG. 3 plots tire azimuth along the abscissa and magnitude of the second harmonic of radial force variation along the ordinate.

In many cases, uniformity measurements are represented as uniformity summary data for one or more selected harmonics of the composite uniformity parameter, such as the first harmonic of radial force variation. The uniformity summary data can include a magnitude of one or more harmonics as well as a phase angle or azimuth of the harmonic. The magnitude of the harmonic can be the difference between the maximum and minimum uniformity measurement associated with the harmonic. The phase angle or azimuth of the first harmonic is defined as the angular offset between the reference location for the measurement and the location of maximum uniformity measurement. For example, referring to FIG. 2, the first harmonic 110 has a magnitude $m_1$ and a phase angle $\theta_1$. In FIG. 3, the second harmonic 120 has a magnitude $m_2$ and a phase angle $\theta_2$.

Uniformity summary data can be expressed or stored as uniformity vectors. Uniformity vectors include data indicative of the magnitude and phase angle of the one or more harmonics. Uniformity vectors can be expressed in polar coordinates based on the magnitude and phase angle. For instance, a vector can have length in polar coordinates equal to the magnitude and an angular coordinate equal to the phase angle. Uniformity vectors can also be expressed as rectangular x and y components. The x and y components can be determined from magnitude and phase angle of a uniformity vector, or vice versa, using vector relationships.

Figure 4:
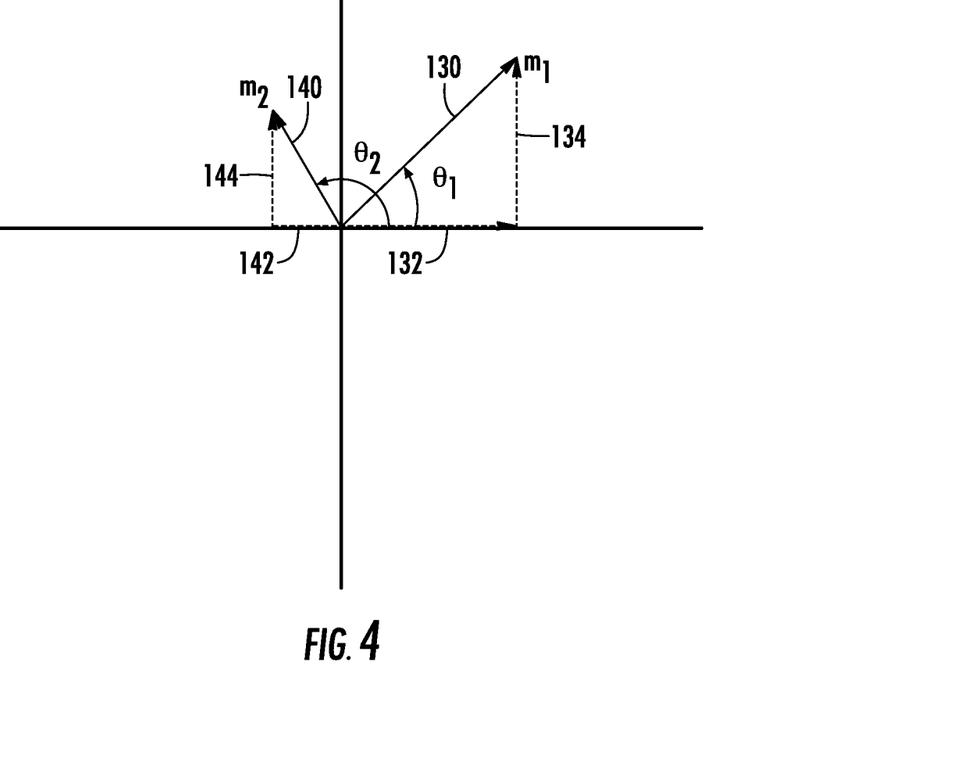
FIG. 4 depicts a representation of example uniformity vectors that can be processed to identify one or more characteristics of a composite uniformity parameter according to example aspects of the present disclosure.

FIG. 4 depicts a representation of example uniformity vectors according to example aspects of the present disclosure. Uniformity vector 130 can be representative of first harmonic 110 of FIG. 2. Uniformity vector 130 of FIG. 4 has a length equal to $m_1$ and angular coordinates associated with phase angle $\theta_1$. The uniformity vector 130 can also be represented as x-component 132 and y-component 134. Uniformity vector 140 can be representative of second harmonic 120 of FIG. 3. Uniformity vector 140 of FIG. 4 has a length equal to $m_1$ and angular coordinates associated with phase angle $\theta_2$. The uniformity vector 140 can also be represented as x-component 142 and y-component 144.

In many cases, uniformity vectors for selected harmonics of a uniformity parameter are the only uniformity data that is measured, stored, and/or otherwise available for a set of a plurality of tires. However, it can be desirable to understand characteristics of the composite uniformity parameter (e.g. as opposed to the individual harmonics) for the set of tires for use in tire uniformity improvement. For instance, it can be desirable to know the range of the composite uniformity parameter for a set of tires and/or the distribution of amplitudes of the composite uniformity parameter for the set of tires for the purposes of predicting uniformity yield and modifying tire manufacture to achieve improved uniformity yield. Uniformity yield refers to the percentage of tires that satisfy one or more uniformity criteria based on uniformity measurements obtained for the tires.

According to example aspects of the present disclosure, properties of multivariate normal distributions can be used to estimate one or more characteristics associated with a composite uniformity parameter from the uniformity vectors for a plurality of harmonics associated with the composite uniformity parameter. For instance, the sum of a plurality of multivariate normal distributions is also a multivariate normal distribution. Based on this principle, a composite multivariate normal distribution can be determined from multivariate normal distributions associated with the uniformity vectors for each of a plurality of harmonics of the composite uniformity parameter. Characteristics of the composite uniformity parameter can then be determined based at least in part on the composite multivariate normal distribution.

For instance, uniformity data associated with a set of a plurality of tires can be obtained. The uniformity data can include a first set of uniformity vectors associated with a first selected harmonic of a uniformity parameter (e.g. the first harmonic) and a second set of uniformity vectors associated with a second selected harmonic (e.g. the second harmonic). The uniformity data can include other sets of uniformity vectors for other different harmonics. For instance, in one implementation, the uniformity data can include sets of uniformity vectors for each of the first four harmonics of the uniformity parameter.

The sets of uniformity vectors can each be associated with a bivariate normal distribution. A bivariate normal distribution is a probability distribution that extends the normal distribution across two dimensions. In the example of uniformity vectors, the bivariate normal distribution can provide normal distributions for both x and y components of the uniformity vectors. Aspects of the present disclosure will be discussed with reference to bivariate normal distributions for purposes of illustration and discussion. Those of ordinary skill in the art, using the disclosures provided herein, will understand that other multivariate normal distributions can be used without deviating from the scope of the present disclosure.

The bivariate normal distribution can have various parameters, including a mean and standard deviation associated with the x-components of the uniformity vectors, a mean and standard deviation associated with the y-components of the uniformity vectors, and a correlation parameter. Parameters associated with the bivariate normal distributions for each of the sets of uniformity vectors can be used to determine one or more parameters of a composite multivariate normal distribution for the set of tires. The one or more parameters can include a mean and a standard deviation associated with the composite bivariate normal distribution. One or more characteristics of a composite uniformity parameter for the set of tires can then be determined from the one or more parameters of composite bivariate normal distribution.

For instance, in one embodiment, the one or more characteristics of the composite uniformity parameter can include a range from a maximum magnitude to a minimum magnitude of the composite uniformity parameter for the set of tires. The range can be determined based at least in part on the standard deviation or other data indicative of variance associated with the composite bivariate normal distribution. In one implementation, a confidence ellipse is determined for the composite bivariate normal distribution and data indicative of the range of the composite uniformity parameter can be determined based at least in part on a major axis of the confidence ellipse.

In another embodiment, the composite uniformity characteristic can include a distribution of amplitudes of the composite uniformity parameter for the set of tires. The distribution of amplitudes can have a direct impact on tire sorting and performance of the tire. According to aspects of the present disclosure, the distribution of amplitudes can be determined from the composite bivariate normal distribution using an infinite sum of Bessel functions.

Tire manufacture can be modified to improve tire uniformity based at least in part on the one or more characteristics identified for the composite uniformity parameter. For example, the range of the composite uniformity parameter can be monitored for different sets of tires during the tire manufacturing process. If the range deviates beyond acceptable thresholds, this can trigger the need for a maintenance event or an adjustment to the tire manufacturing process to reduce the range of the composite uniformity parameter to within acceptable threshold. For instance, the rotation of tires relative to certain process elements used during tire manufacture can be adjusted to reduce the range of the composite uniformity parameter. As another example, the distribution of amplitudes of the composite uniformity parameter for the set of tires can be used to predict uniformity yield. Sorting limits can be set for uniformity correction and/or grading to adjust uniformity yield to within desired levels based on the distribution of amplitudes.

Example Methods for Improving the Uniformity of a Tire

Figure 5:
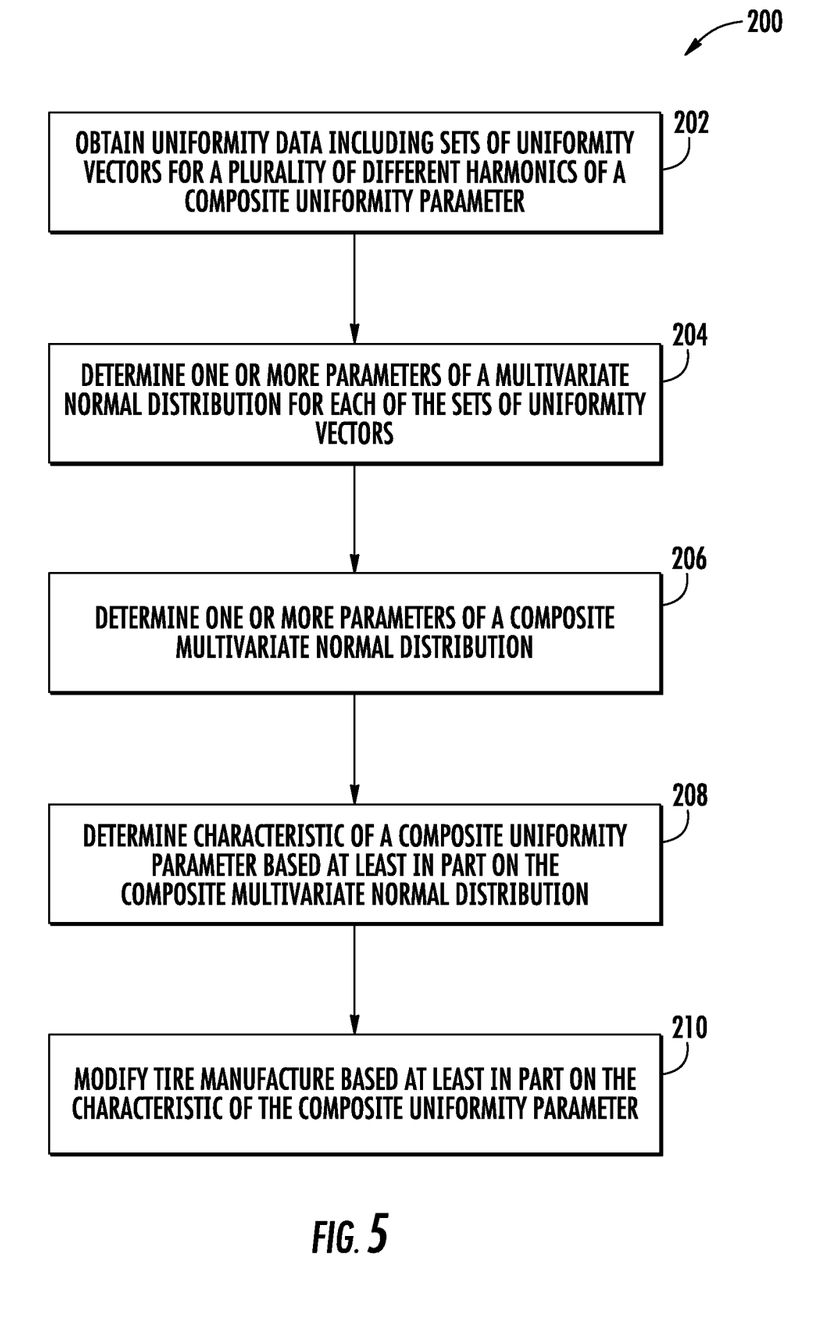
FIG. 5 depicts a flow diagram of an example method for improving tire uniformity according to example aspects of the present disclosure.

FIG. 5 depicts a flow diagram of an example method (200) for improving tire uniformity according to example aspects of the present disclosure. Aspects of the method (200) can be implemented by one or more computing devices, such as one or more of the computing devices depicted in FIG. 8. In addition, FIG. 5 depicts steps performed in a particular order for purposes of illustration and discussion. Those of ordinary skill in the art, using the disclosures provided herein, should understand that the steps of any of the methods disclosed herein can be rearranged, adapted, modified, omitted, or expanded in various ways without deviating from the scope of the present disclosure.

At (202), the method includes obtaining uniformity data of a uniformity parameter for a set of a plurality of tires. The uniformity parameter can correspond to any suitable uniformity parameter. For instance, the uniformity parameter can correspond to such uniformity parameters as radial run out, lateral run out, mass variance, balance, radial force variation, lateral force variation, and tangential force variation.

The uniformity data can include a plurality of sets of uniformity vectors. Each set of uniformity vectors can be associated with a different harmonic of a composite uniformity parameter. For instance, the uniformity data can include a first set of uniformity vectors associated with a first selected harmonic (e.g. the first harmonic, second harmonic, third harmonic, fourth harmonic, etc.) of a uniformity parameter. Each uniformity vector in the first set can be associated with a different tire in the set of tires. In addition, the uniformity data can include a second set of uniformity vectors associated with a second selected harmonic (e.g. the first harmonic, second harmonic, third harmonic, fourth harmonic etc.) of the uniformity parameter. The second selected harmonic is different from the first selected harmonic. Each uniformity vector in the second set can be associated with a different tire in the set of tires.

The uniformity data can be previously derived from uniformity measurements and stored in one or more memory devices. Obtaining the uniformity data can include accessing the uniformity data stored in the memory. In another embodiment, obtaining the uniformity data can include determining the uniformity data in conjunction with measuring the uniformity parameters with a uniformity measurement machine.

At (204), the method includes determining one or more parameters of a multivariate normal distribution (e.g. a bivariate normal distribution) for each of the sets of uniformity vectors. The formula for a p-dimensional multivariate normal density function is provided below:

$$N_p(\mu, \Sigma) = (2\pi)^{1/2}|\Sigma|^{-1/2}e^{(-1/2(x-\mu)\Sigma^{-1}(x-\mu))}$$

$$\mu = (\mu_1 \mu_2 \mu_3 \ldots \mu_p)'$$

$$\Sigma = \begin{matrix} \sigma_{x1}^2 & \sigma_{x1 \times 2} & \cdot & \sigma_{x1xp} \\ \sigma_{x2x1} & \sigma_{x2}^2 & \cdot & \sigma_{x2xp} \\ \vdots & \vdots & \vdots & \vdots \\ \sigma_{xpx1} & \sigma_{xpx2} & \cdot & \sigma_{xp}^2 \end{matrix}$$

where $\mu_i$ is a mean associated with ith dimension of the p-dimensional multivariate normal distribution and $\sigma_i$ is a standard deviation associated with the ith dimension of the p-dimensional multivariate normal distribution.

Figure 6:
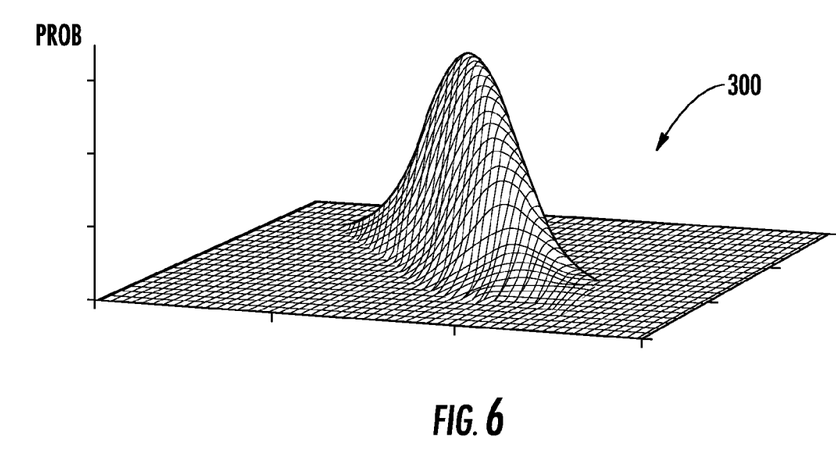
FIG. 6 depicts an example bivariate normal distribution.

A multivariate normal distribution becomes a bivariate normal distribution when p=2. A bivariate normal distribution can be characterized by five parameters, including ($\mu_x$, $\mu_y$, $\sigma_x$, $\sigma_y$, and $\rho$) where $\mu_x$ is a mean associated with an x-dimension, $\mu_y$ is a mean associated with a y-dimension, $\sigma_x$ is a standard deviation associated with the x-dimension, $\sigma_y$ is a standard deviation associated with the y-dimension, and $\rho$ or $\sigma_x\sigma_y$ is a correlation between the x-dimension, and the y-dimension. FIG. 6 depicts an example bivariate normal probability density function 300 associated with a strong positive correlation. FIG. 6 plots an x-dimension along the abscissa, a y-dimension along the ordinate, and probability along the applicate.

According to example aspects of the present disclosure, one or more parameters of a bivariate normal distribution can be determined for each of the sets of uniformity vectors. The x-components of the uniformity vectors can serve as the basis for one dimension of the bivariate normal distribution. The y-components of the uniformity vectors can serve as the basis for the other dimension of the bivariate normal distribution. The parameters identified for each set of uniformity vectors can include, for instance, a mean and standard deviation associated with the x-components of the uniformity vectors and a mean and standard deviation associated with the y-components of the uniformity vectors. The parameters can also include a correlation between the x-components and the y-components. The parameters can be identified using statistical analysis of the uniformity vectors.

For instance, in one particular implementation, the method can include identifying a first set of parameters for a first bivariate normal distribution for a first selected harmonic and a second set of parameters for a second bivariate normal distribution for a second selected harmonic. The first set of parameters for the first multivariate normal distribution can include one or more of a mean of x-components of the first set of uniformity vectors, a mean of y-components of the first set of uniformity vectors, a standard deviation of the x-components of the first set of uniformity vectors, a standard deviation of the y-components of the first set of uniformity vectors, and a correlation associated with the first set of uniformity vectors.

The second set of parameters for the second multivariate normal distribution can include one or more of a mean of x-components of the second set of uniformity vectors, a mean of y-components of the second set of uniformity vectors, a standard deviation of the x-components of the second set of uniformity vectors, a standard deviation of the y-components of the second set of uniformity vectors, and a correlation associated with the second set of uniformity vectors. Parameters of bivariate normal distributions for additional sets of uniformity vectors associated with different selected harmonics can also be determined without deviating from the scope of the present disclosure.

At (206), the method can include determining one or more parameters of a composite multivariate normal distribution based at least in part on the multivariate normal distributions associated with each of the sets of uniformity vectors. The one or more parameters of the composite multivariate normal distribution can be determined by summing the multivariate normal distributions associated with each of the sets of uniformity vectors.

More particularly, it can be shown that the sum of multivariate normal distributions is itself a multivariate normal distribution. Parameters associated with the composite multivariate normal distribution can be determined by summing the parameters associated with the individual multivariate normal distributions associated with each of the sets of uniformity vectors.

For example, a mean associated with the x-components of a composite multivariate normal distribution can be determined by summing the means associated with the x-components of each individual multivariate normal distribution associated with each of the sets of uniformity vectors. A mean associated with the y-components of the composite multivariate normal distribution can be determined by summing the means associated with the y-components of each individual multivariate normal distribution associated with each of the sets of uniformity vectors.

A standard deviation associated with the x-components of the composite multivariate normal distribution can be determined by summing squares of the standard deviations associated with the x-components of each individual multivariate normal distribution associated with each of the sets of uniformity vectors and then taking the square root of the resulting sum. A standard deviation associated with the y-components of the composite multivariate normal distribution can be determined by summing the squares of the standard deviations associated with the y-components of each individual multivariate normal distribution associated with each of the sets of uniformity vectors and taking the square root of the resulting sum.

Once one or more parameters of the composite multivariate normal distribution have been determined, the method can include determining one or more characteristics of the composite uniformity parameter based at least in part on the composite multivariate normal distribution (208). The one or more characteristics can include, for instance, a range of the composite uniformity parameter for the set of tires and/or a distribution of magnitudes of the composite uniformity parameter for the set of tires, and other characteristics.

More particularly, a range of the composite uniformity parameter can be determined based at least in part on a standard deviation associated with the composite multivariate normal distribution. For large sets of tires, the range can be determined as six times the standard deviation associated with the composite multivariate normal distribution. The range can be determined independently for both the x-components and the y-components of the composite multivariate normal distribution. For instance, a range associated with the x-components can be determined based on a standard deviation associated with the x-components of the composite multivariate normal distribution. A range associated with the y-components can be determined based on a standard deviation associated with the y-components of the composite multivariate normal distribution.

The range of the composite uniformity parameter can also be determined using a confidence ellipse. More particularly, the range can be determined based at least in part on a confidence ellipse determined using the one or more composite parameters for the composite multivariate normal distribution. For example, if the composite multivariate normal distribution has parameters: ($\mu_x$, $\mu_y$, $\sigma_x$, $\sigma_y$, $\rho$) then the range of the composite uniformity parameter is estimated as the major axis of the appropriate confidence ellipse. The equation of the confidence ellipse can be as follows:.

$$\sigma_y^2(x-\mu_x)^2 - 2\rho\sigma_x\sigma_y(x-\mu_x)(y-\mu_y) + \sigma_x^2(x-\mu_x)^2 = (1-\rho^2)\sigma_x^2\sigma_y^2 T^2$$

In the formula the $T^2$ term determines the coverage of the distribution (95%, 99%, etc.) and is the Hotelling statistic whose values are computed using the following formula where n is the number of datapoints used in the computation and the standard F is the standard distribution of statistics.

$$T^2 = 2\left(\frac{n-1}{n-2}\right)F_{2,n-2}$$

Given this equation one can compute the length of the major axis q using the next formula.

$$q = \left(\frac{2(1-\rho^2)\sigma_x^2\sigma_y^2 T^2}{\sigma_y^2 + \sigma_x^2 - R}\right)$$

$$R = \left[(\sigma_y^2 - \sigma_x^2)^2 + 4(\rho\sigma_y\sigma_x)^2\right]^{1/2}$$

The characteristic of the composite uniformity parameter determined from the composite multivariate normal distribution can further include a distribution of amplitudes of the composite uniformity parameter for the set of tires. The distribution of amplitudes of the composite uniformity parameter can be important in determining impact on uniformity yield. According to aspects of the present disclosure, the composite multivariate normal distribution can be converted to a distribution of amplitudes using an approximation as an infinite sum of Bessel functions.

For example, the distribution of amplitudes p(m) can be given by the following in which the $I_j$ terms are Bessel functions.

$$p(m) = Am\exp(-B)^*S$$

$$A = \frac{1}{\sigma_x\sigma_y}\exp\left(-\frac{\mu_x^2\sigma_x^2 + \mu_y^2\sigma_y^2}{2\sigma_x^2\sigma_y^2}\right)$$

$$S = \left(I_0(cm^2)I_0(dm) + 2\sum I_j(cm^2)I_{2j}(dm)\cos(2j\theta)\right)$$

$$c = \frac{\sigma_x^2 - \sigma_y^2}{4\sigma_x^2\sigma_y^2}$$

$$d = \left(\left(\frac{\mu_x}{\sigma_x^2}\right)^2 + \left(\frac{\mu_y}{\sigma_y^2}\right)^2\right)^{1/2}$$

$$\theta = \tan^{-1}\left(\frac{\mu_y\sigma_x^2}{\mu_x\sigma_y^2}\right)$$

$$B = \frac{m^2(\sigma_x^2 + \sigma_y^2)}{4\sigma_x^2\sigma_y^2}$$

At (210), the method includes modifying tire manufacture based at least in part on the one or more characteristics of the composite uniformity parameter. For example, the range of the composite uniformity parameter can be monitored for different sets of tires during the tire manufacturing process based on the one or more characteristics of the composite uniformity parameter. If the range deviates beyond acceptable thresholds, this can trigger the need for a maintenance event or an adjustment to the tire manufacturing process to reduce the range of the composite uniformity parameter to within acceptable threshold. For instance, the rotation of tires relative to certain process elements used during tire manufacture can be adjusted to reduce the range of the composite uniformity parameter.

As another example, the distribution of amplitudes of the composite uniformity parameter for the set of tires can be used to predict uniformity yield. Sorting limits can be set for uniformity correction and/or grading to adjust uniformity yield to within desired levels based on the distribution of amplitudes.

Figure 7:
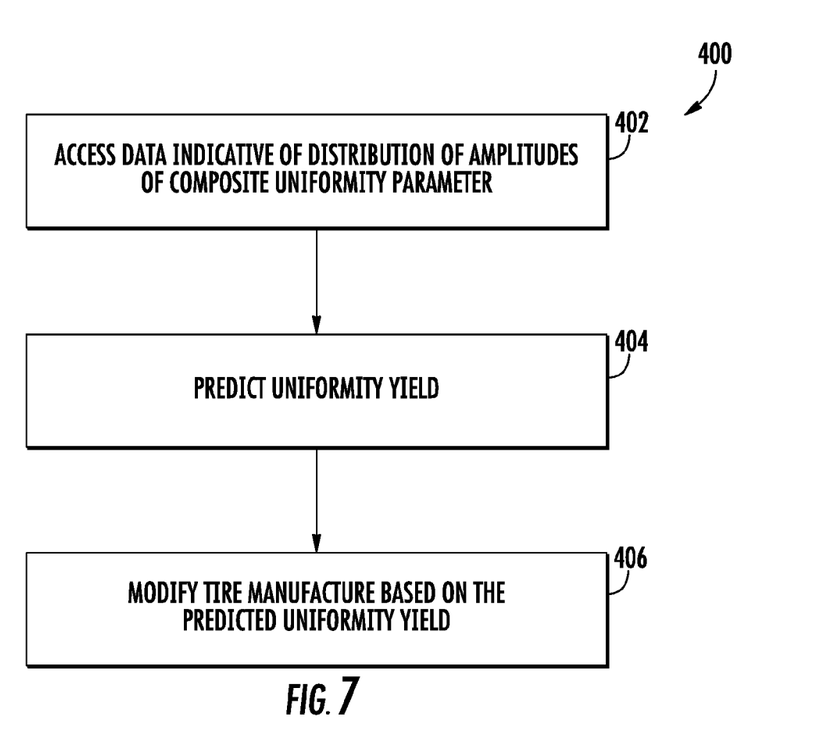
FIG. 7 depicts a flow diagram of an example method for modifying tire manufacture to improve tire uniformity according to example aspects of the present disclosure.

FIG. 7 depicts a flow diagram of an example method (400) for modifying tire manufacture according to example embodiments of the present disclosure. At (402), one or more characteristics of the composite uniformity parameter indicative of a distribution of amplitudes of the composite uniformity parameter for the set of tires is accessed. At (404), uniformity yield is predicted for one or more thresholds based at least in part on the predicted uniformity yield. For instance, the number of tires that exceed a threshold can be estimated based on the distribution of amplitudes. The number of tired exceeding the threshold can be used to predict uniformity yield. At (406), tire manufacture can be modified based on the predicted uniformity yield. For instance, the thresholds can be adjusted to obtain a desired uniformity yield for the set of tires.

Example Systems for Improving Tire Uniformity

Figure 8:
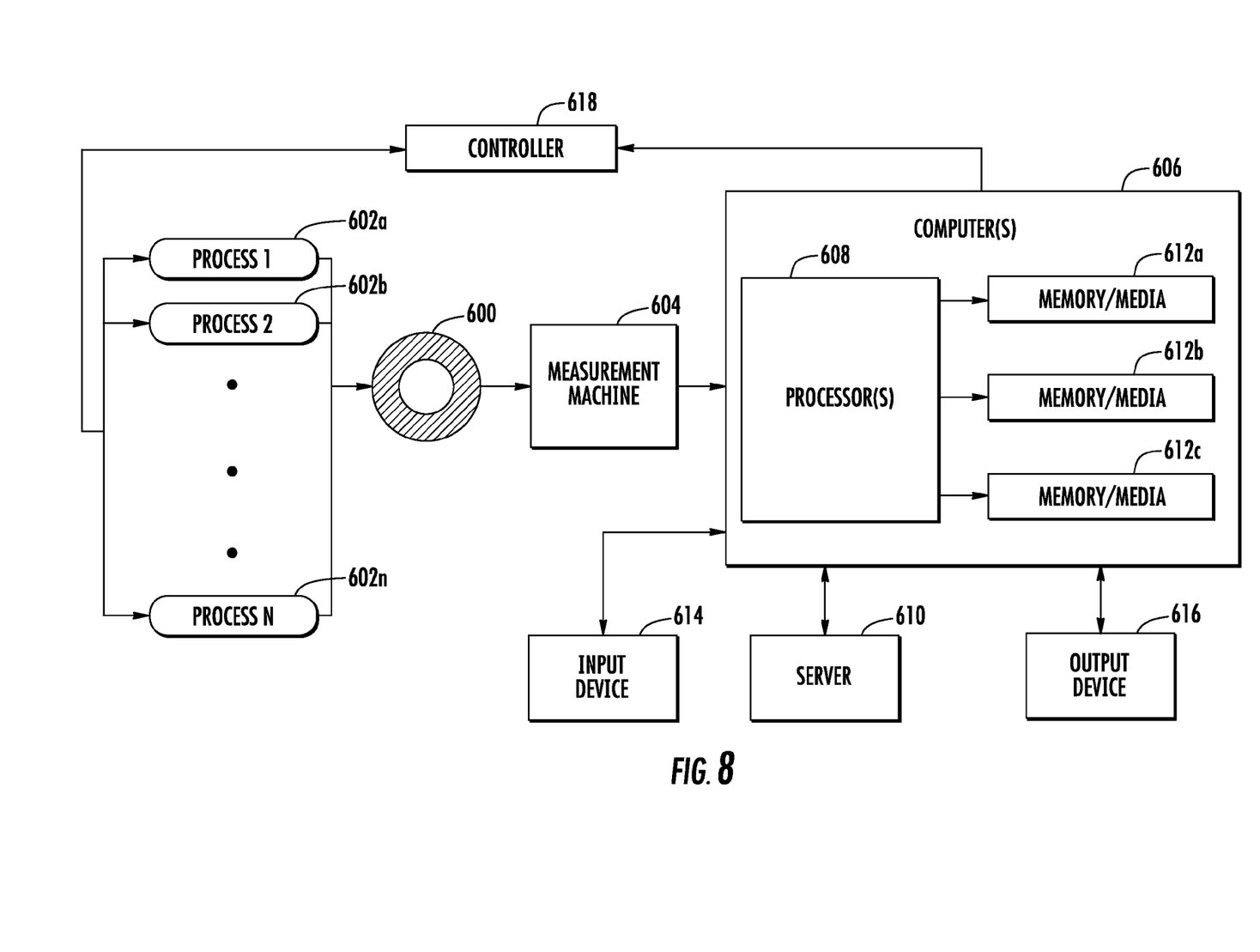
FIG. 8 depicts an example system for improving tire uniformity according to example aspects of the present disclosure.

Referring now to FIG. 8, a schematic overview of example system components for implementing the above-described methods is illustrated. An example tire 600 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing press, and curing the finished green tire, etc. Such respective process elements are represented as 602a, 602b, . . . , 602n in FIG. 8 and combine to form example tire 600. It should be appreciated that a batch of multiple tires can be constructed from one iteration of the various processes 602a through 602n.

Referring still to FIG. 8, a measurement machine 604 is provided to obtain the uniformity measurements of the tire 600. The uniformity measurement machine 604 can be configured to measure uniformity parameters such as radial force variation, lateral force variation, tangential force variation, radial run out, lateral run out, and other uniformity parameters of the tire 600. The uniformity measurement machine 604 can also include a road wheel used to load the tire to obtain force measurements as the tire 600 is rotated.

The measurements obtained by measurement machine 604 can be relayed such that they are received at one or more computing devices 606, which may respectively contain one or more processors 608, although only one computer and processor are shown in FIG. 8 for ease and clarity of illustration. Processor(s) 608 may be configured to receive input data from input device 614 or data that is stored in memory 612. Processor(s) 608, can then analyze such measurements in accordance with the disclosed methods, and provide useable output such as data to a user via output device 616 or signals to a process controller 618. Uniformity analysis may alternatively be implemented by one or more servers 610 or across multiple computing and processing devices, either sequentially or in parallel.

Various memory/media elements 612a, 612b, 612c (collectively, "612") may be provided as a single or multiple portions of one or more varieties of non-transitory computer-readable media, including, but not limited to, RAM, ROM, hard drives, flash drives, optical media, magnetic media or other memory devices. The computing/processing devices of FIG. 8 can be adapted to function as a special-purpose machine providing desired functionality by accessing software instructions rendered in a computer-readable form stored in one or more of the memory/media elements. When software is used, any suitable programming, scripting, or other type of language or combinations of languages may be used to implement the teachings contained herein.

In one implementation, the processor(s) 608 can execute computer-readable instructions that are stored in one or more of the memory elements 612a, 612b, and 612c to cause the processor to perform operations. The operations can include identifying one or more characteristics of a composite uniformity parameter from uniformity summary data according to example aspects of the present disclosure disclosed herein.

Example Results

Sets of uniformity vectors for the first four harmonics of radial force variation for a set of tires were accessed. Standard deviations associated with bivariate normal distributions were determined for each of the sets of uniformity vectors. The standard deviations were used to determine a composite standard deviation for a composite multivariate normal distribution. The range of the composite uniformity parameter was estimated as six times the composite standard deviation. Results are summarized in Table 1 below:

TABLE 1

| Harmonic | Standard Deviation | Observed Average Range |
| --- | --- | --- |
| 1 | 1.09 | |
| 2 | 0.72 | |
| 3 | 0.35 | |
| 4 | 0.30 | |
| Composite | 1.34 | |
| Estimated Range | 8.06 | 8.61 |

As demonstrated, the range of the composite uniformity parameter can be closely estimated using the sum of multivariate normal distributions associated with the individual harmonics. The discrepancy between the estimate and the observed value may be due to factors such as measurement error, use of only the first four harmonics, and/or correlation between the harmonics.

As an example computing a distribution of amplitudes using Bessel functions, one can use the values taken from observations to specify realistic values for the component means of (0.73, 1.22) and of (3.50, 3.50) for the associated standard deviations. The Bessel function computation yields an estimate of the mean value as 4.31 kgs whereas the observed mean over n=2515 observations is 4.50 kgs. This small discrepancy between these values could be due to small departures from strict bivariate normality that could be the result of combining multiple production runs in one dataset.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of improving the uniformity of a tire, comprising:

obtaining, by one or more computing devices, uniformity data associated with a set of a plurality of tires, the uniformity data comprising a first set of uniformity vectors associated with a first selected harmonic of a uniformity parameter measured for the set of tires and a second set of uniformity vectors associated with a second selected harmonic of the of the uniformity parameter;

determining, by the one or more computing devices, a first set of parameters for a first multivariate normal distribution associated with the first set of uniformity vectors;

determining, by the one or more computing devices, a second set of parameters for a second multivariate normal distribution associated with the second set of uniformity vectors;

determining, by the one or more computing devices, a composite set of parameters associated with a composite multivariate normal distribution for the set of tires based at least in part on the first set of parameters and the second set of parameters;

identifying, by the one or more computing devices, one or more characteristics of a composite uniformity parameter for the set of tires based at least in part on the composite set of parameters; and modifying tire manufacture based at least in part on the one or more characteristics of the composite uniformity parameter.

2. The method of claim 1, wherein the first multivariate normal distribution, the second multivariate normal distribution, and the composite multivariate normal distribution are bivariate normal distributions.

3. The method of claim 1, wherein determining, by the one or more computing devices, a composite set of parameters associated with a composite multivariate normal distribution comprises summing, by the one or more computing devices, the first multivariate normal distribution and the second multivariate normal distribution to determine the composite multivariate normal distribution.

4. The method of claim 1, wherein:

the first set of parameters for the first multivariate normal distribution comprises one or more of a mean of x-components of the first set of uniformity vectors, a mean of y-components of the first set of uniformity vectors, a standard deviation of the x-components of the first set of uniformity vectors, a standard deviation of the y-components of the first set of uniformity vectors, and a correlation associated with the first set of uniformity vectors; and the second set of parameters for the second multi variate normal distribution comprises one or more of a mean of a x-components of the second set of uniformity vectors, a mean of y-components of the second set of uniformity vectors, a standard deviation of the x-components of the second set of uniformity vectors, a standard deviation of the y-components of the second set of uniformity vectors, and a correlation associated with the second set of uniformity vectors.

5. The method of claim 4, wherein the composite set of parameters associated with the composite multivariate normal distribution comprises one or more of a mean of x-components associated with the composite multivariate normal distribution, a mean of y-components associated with the composite multivariate normal distribution, a standard deviation of the x-components associated with the composite multivariate normal distribution, a standard deviation of y-components associated with the composite multivariate normal distribution, and a correlation associated with the composite multivariate normal distribution.

6. The method of claim 1, wherein the one or more characteristics of the composite uniformity parameter comprises a range of the composite uniformity parameter for the set of tires.

7. The method of claim 6, wherein the range of the composite uniformity parameter is determined based at least in part on a standard deviation associated with the composite multivariate normal distribution.

8. The method of claim 6, wherein the range of the composite uniformity parameter is determined based at least in part on a major axis associated with a confidence ellipse, the major axis determined based at least in part on the composite set of parameters associated with the composite multi variate normal distribution.

9. The method of claim 1, wherein the one or more characteristics of the composite uniformity parameter comprises a distribution of amplitudes associated with the uniformity parameter for the set of tires.

10. The method of claim 9, wherein the distribution of amplitudes is determined from the composite multivariate normal distribution using a sum of Bessel functions.

11. The method of claim 1, wherein modifying tire manufacture comprises:
predicting a uniformity yield based at least in part on the one or more characteristics of the composite uniformity parameter; and
modifying tire manufacture based at least in part on the uniformity yield.

12. The method of claim 11, wherein modifying tire manufacture based at least in part on the uniformity yield comprises adjusting a sorting threshold for the uniformity parameter based at least in part on the uniformity yield.

13. The method of claim 11, wherein modifying tire manufacture based at least in part on the uniformity yield comprises rotating one or more tires relative to one or more process elements used in tire manufacture based at least in part on the one or more characteristics of the composite uniformity parameter.

14. The method of claim 1, wherein the uniformity parameter comprises one or more of low and high speed radial force variation, tangential force variation, radial run out, lateral run out, mass variance, conicity, and ply steer.

15. A system for improving the uniformity of a tire, the system comprising one or more processors and one or more memory devices, the one or more memory devices storing computer-readable instructions that when executed by the one or more processors cause the one or more processors to perform operations, the operations comprising:
obtaining uniformity data associated with a set of a plurality of tires, the uniformity data comprising a first set of uniformity vectors associated with a first selected harmonic of a uniformity parameter measured for the set of tires and a second set of uniformity vectors associated with second selected harmonic of the of the uniformity parameter;
determining a first set of parameters for a first multivariate normal distribution associated with the first set of uniformity vectors;
determining a second set of parameters for a second multivariate normal distribution associated with the second set of uniformity vectors;
determining a composite set of parameters associated with a composite multivariate normal distribution for the set of tires based at least in part on the first set of parameters and the second set of parameters;
identifying one or more characteristics of a composite uniformity parameter for the set of tires based at least in part on the composite set of parameters.

* * * * *